US009390546B2

(12) United States Patent
Buckton et al.

(10) Patent No.: US 9,390,546 B2
(45) Date of Patent: Jul. 12, 2016

(54) METHODS AND SYSTEMS FOR REMOVING OCCLUSIONS IN 3D ULTRASOUND IMAGES

(71) Applicants: General Electric Company, Schenectady, NY (US); TECHNISCHE UNIVERSITÄT WIEN, Vienna (AT)

(72) Inventors: Daniel John Buckton, Salzburg (AT); Gerald Schroecker, Salzburg (AT); Andrej Varchola, Vienna (AT); Stefan Bruckner, Vienna (AT); Eduard Groeller, Vienna (AT); Johannes Novotny, Vienna (AT)

(73) Assignee: General Electric Company, Schenectady, NY (US)

( * ) Notice: Subject to any disclaimer, the term of this patent is extended or adjusted under 35 U.S.C. 154(b) by 298 days.

(21) Appl. No.: 14/067,794

(22) Filed: Oct. 30, 2013

(65) Prior Publication Data
US 2015/0116323 A1 Apr. 30, 2015

(51) Int. Cl.
*G06T 19/00* (2011.01)
*G06T 15/00* (2011.01)
*G06T 15/30* (2011.01)
*G06T 15/08* (2011.01)

(52) U.S. Cl.
CPC .............. *G06T 15/08* (2013.01); *G06T 15/30* (2013.01); *G06T 19/00* (2013.01); *G06T 2207/10136* (2013.01); *G06T 2210/41* (2013.01); *G06T 2219/008* (2013.01)

(58) Field of Classification Search
None
See application file for complete search history.

(56) References Cited

U.S. PATENT DOCUMENTS

| 6,102,861 | A | 8/2000 | Avila et al. | |
|---|---|---|---|---|
| 2005/0163358 | A1* | 7/2005 | Moeller | G06K 9/342 382/128 |
| 2005/0240104 | A1 | 10/2005 | Shim et al. | |
| 2010/0245353 | A1 | 9/2010 | Lee | |
| 2011/0087102 | A1* | 4/2011 | Hamada | A61B 8/06 600/443 |
| 2011/0091086 | A1* | 4/2011 | Seko | A61B 8/463 382/131 |
| 2011/0125016 | A1 | 5/2011 | Lazebnik | |
| 2011/0137168 | A1 | 6/2011 | Lee | |

OTHER PUBLICATIONS

G.P. Penney, J.M. Blackall, M.S. Hamady, T. Sabharwal, A. Adam, D.J. Hawkes "Registration of freehand 3D ultrasound and magnetic resonance liver images", 2004, Elsevier.*
Wolfgang Wein, Barbara Roper, Nassir Navab, "Automatic Registration and Fusion of Ultrasound with CT for Radiotherapy", 2005, SpringerLink.*

(Continued)

*Primary Examiner* — Mark Zimmerman
*Assistant Examiner* — Yu-Jang Tswei
(74) *Attorney, Agent, or Firm* — Dean D. Small; The Small Patent Law Group, LLC

(57) ABSTRACT

Methods and system for visualizing 3D ultrasound data are provided. One method includes obtaining image slices from a volumetric image data set and generating a ray profile using one or more rays through at least one of the image slices, wherein the one or more rays extend along a depth of the volumetric image data set. The method further includes identifying one or more seed points along the one or more rays and defining a clipping surface using the one or more seed points, wherein the clipping surface defines a rendering region within the volumetric image data set. The method also includes rendering a 3D image of the rendering region within the volumetric image data set.

20 Claims, 11 Drawing Sheets

(56) References Cited

OTHER PUBLICATIONS

Johannes Novotny: "Application of Smart Visibility on Medical 3D Ultrasound Datasets", Technische Universitat Wien—Diplomarbeit, May 23, 2013, pp. A-103.

York et al., "Ultrasound Processing and Computing: Review and Future Directions," Annual Review of Biomedical Engineering, Annual Review Inco., Palo Alto, CA, US, vol. 1, Jan. 1, 1999, pp. 559-588.

International Search Report and Written Opinion regarding International Application No. PCT/US2014/051114, mail date Mar. 12, 2015, 15 pages.

Shaolei Feng, Kevin Zhou, Sara Good, and Dorin Comaniciu; Automatic Fetal Face Detection From Ultrasound Volumes Via Learning 3D and 2D Information; CVPR 2009; Integrated Data Systems Department, Siemens Corporate Research, Princeton, NJ 08540; Siemens Medical Solutions, Innovations Division, CA 94043.

* cited by examiner

METHODS AND SYSTEMS FOR REMOVING OCCLUSIONS IN 3D ULTRASOUND IMAGES

BACKGROUND

The subject matter disclosed herein relates generally to ultrasound imaging systems, and more particularly to methods for removing occlusions in a three-dimensional (3D) rendered ultrasound image.

Ultrasound is used in many different medical imaging applications, such as for imaging a fetus. Ultrasound imaging systems typically include ultrasound-scanning devices, such as ultrasound probes having transducers connected to an ultrasound system to control the acquisition of ultrasound data for performing various ultrasound scans (e.g., imaging a volume or body). An ultrasound system usually includes a control portion (e.g., a control console or portable unit) that provides interfaces for interacting with a user, such as receiving user inputs and displaying acquired ultrasound images.

Ultrasound imaging systems are capable of creating two-dimensional (2D), 3D, and four-dimensional (4D) images. 3D and 4D imaging is an extension of 2D imaging. To create a 3D image, the imaging system uses a plurality of 2D images to construct, or render, the 3D image.

During the rendering process used to generate the 3D image, conventional ultrasound systems may require manual intervention from an operator to define a region of interest (ROI) within one or more 2D images. For example, in the prenatal ultrasound scanning of a fetus, the feature of interest may be the face of fetus and a ROI may be defined that encompasses the face of the fetus.

Because uninteresting or non-clinically relevant structures such as surrounding tissue (e.g., a portion of the womb, placenta, uterine tissue, and/or the like) may occlude (e.g., block, hide and/or otherwise obfuscate) the view of the fetus, the clinician may adjust the ROI several times before obtaining a satisfactory view of the feature of interest. The ROI may be generally rectangular with one or more sides that may be curved. A clinician may adjust the ROI by moving a control point along the curved sides. But, because the contour of the fetus may vary greatly, thus the shape of the ROI may require significant changes to conform to the contour of the fetus. Furthermore, inexperienced clinicians may have difficulty in defining the shape of the ROI, and experienced users may take the time to move and readjust the ROI. Accordingly, defining the shape of the ROI to obtain the proper visualization for subsequent processing (such that the area of interest is not obstructed) can be a time consuming and difficult process. A reduction in investigation time can improve the comfort of the patients. Additionally, providing a clear, unobstructed view may improve the communication of the findings between the clinician and the patient. These improvements may lead to increased confidence in the prenatal diagnosis and decrease the cost of the examination.

BRIEF DESCRIPTION

In an embodiment, a method of visualizing 3D ultrasound data is provided. The method includes acquiring image slices from a volumetric image data set and generating a ray profile using one or more rays through at least one of the image slices. The one or more rays extend along a depth of the volumetric image data set. The method includes identifying one or more seed points along the one or more rays based on the ray profile. The method includes identifying one or more anchor points located a defined distance relative to the one or more seed points. The method includes defining a clipping surface using the one or more anchor points, wherein the clipping surface defines a rendering region within the volumetric image data set. The method includes rendering a 3D image of the rendering region within the volumetric image data set.

In another embodiment, an ultrasound imaging system is provided. The ultrasound imaging system includes an ultrasound probe configured to acquire a volumetric image data set having a plurality of image slices. The ultrasound imaging system includes a ray casting module configured to traverse a ray through the ultrasound image slices to create a ray profile, wherein the ray casting module is further configured to create a clipping surface based on the ray profile. The ultrasound imaging system further includes a visualization module configured generate a representation of an object of interest and remove occluded features based on the clipping surface, wherein the contour of the clipping surface is based on anchor points positioned within the volumetric image data and the location of the anchor points is determined by the ray profile. The ultrasound imaging system also includes a display configured to display the representation of the object.

In another embodiment, a method of visualizing a fetus for prenatal sonography is provided. The method includes acquiring a plurality of ultrasound image slices with varying depth through an imaging volume. The method includes analyzing the ultrasound image slices by traversing one or more rays through one or more pixels in the image slices. The method further includes creating a ray profile using a ray casting module, wherein the ray profile includes at least one of an intensity, a color, or an opacity corresponding to points along the ray. The method also includes identifying at least one seed point along the ray based on the ray profile. The method includes identifying one or more anchor points based on the seed points, wherein the anchor points are located within regions identified as regions containing amniotic fluid. The method includes defining a clipping surface based on the one or more anchor points and rendering an image of the fetus based on the clipping surface.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION

Figure 1:
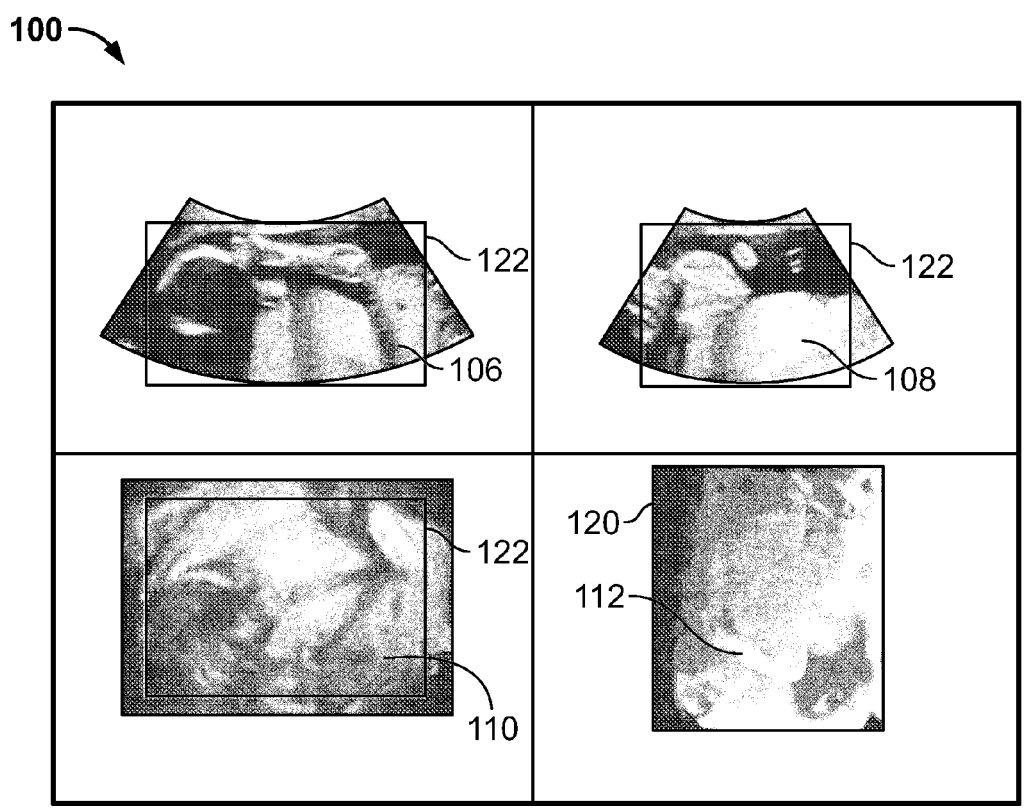
FIG. 1 is a screenshot from a user interface of an imaging system illustrating a region of interest (ROI).

The detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, a single piece of hardware (e.g., a general-purpose signal processor or a block of random access memory, hard disk, or the like) may implement one or more of the functional blocks (e.g., processors or memories). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 9:
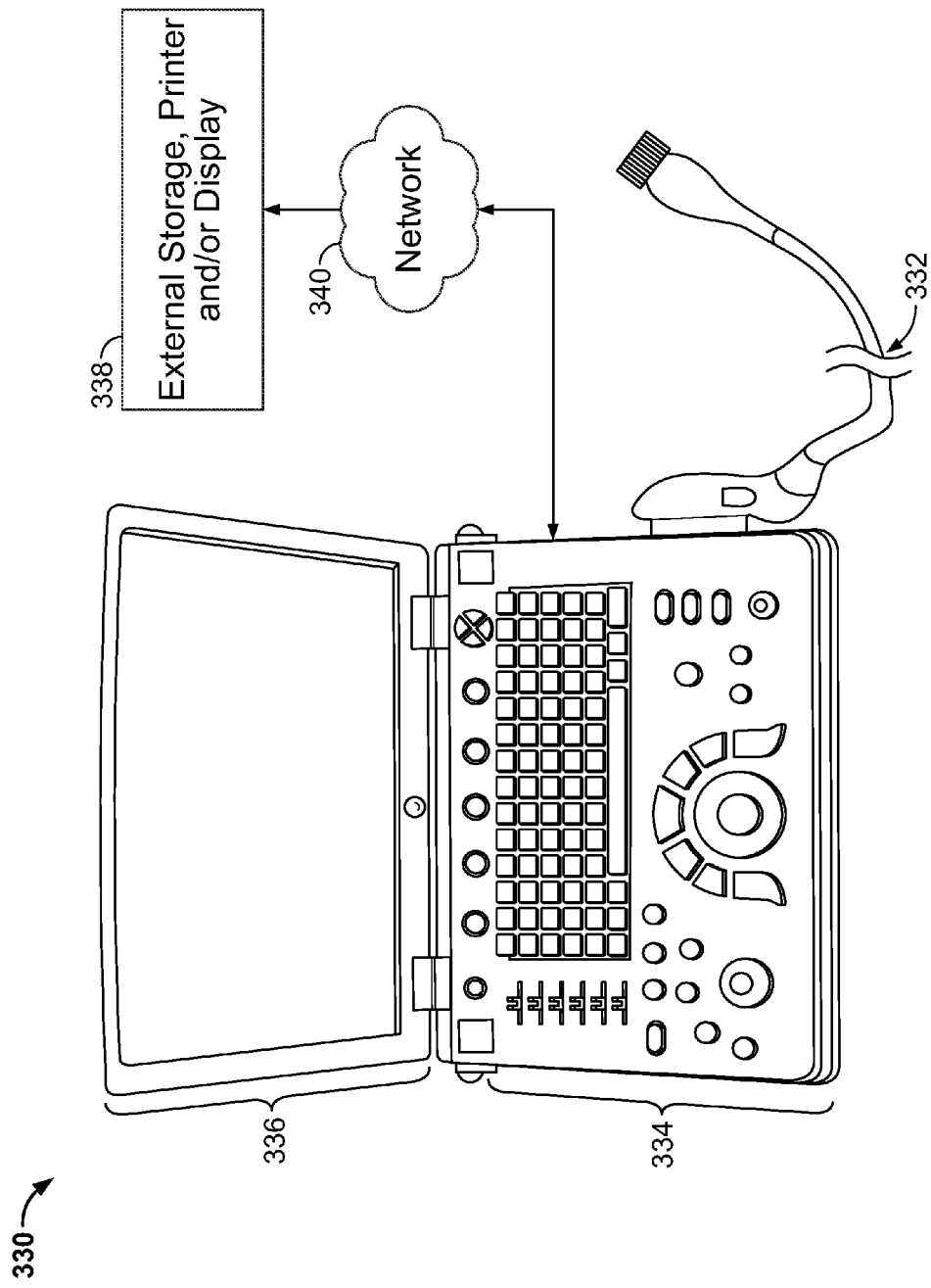
FIG. 9 illustrates a 3D capable miniaturized ultrasound system having a probe that may be configured to acquire 3D ultrasonic data or multi-plane ultrasonic data.
Figure 10:
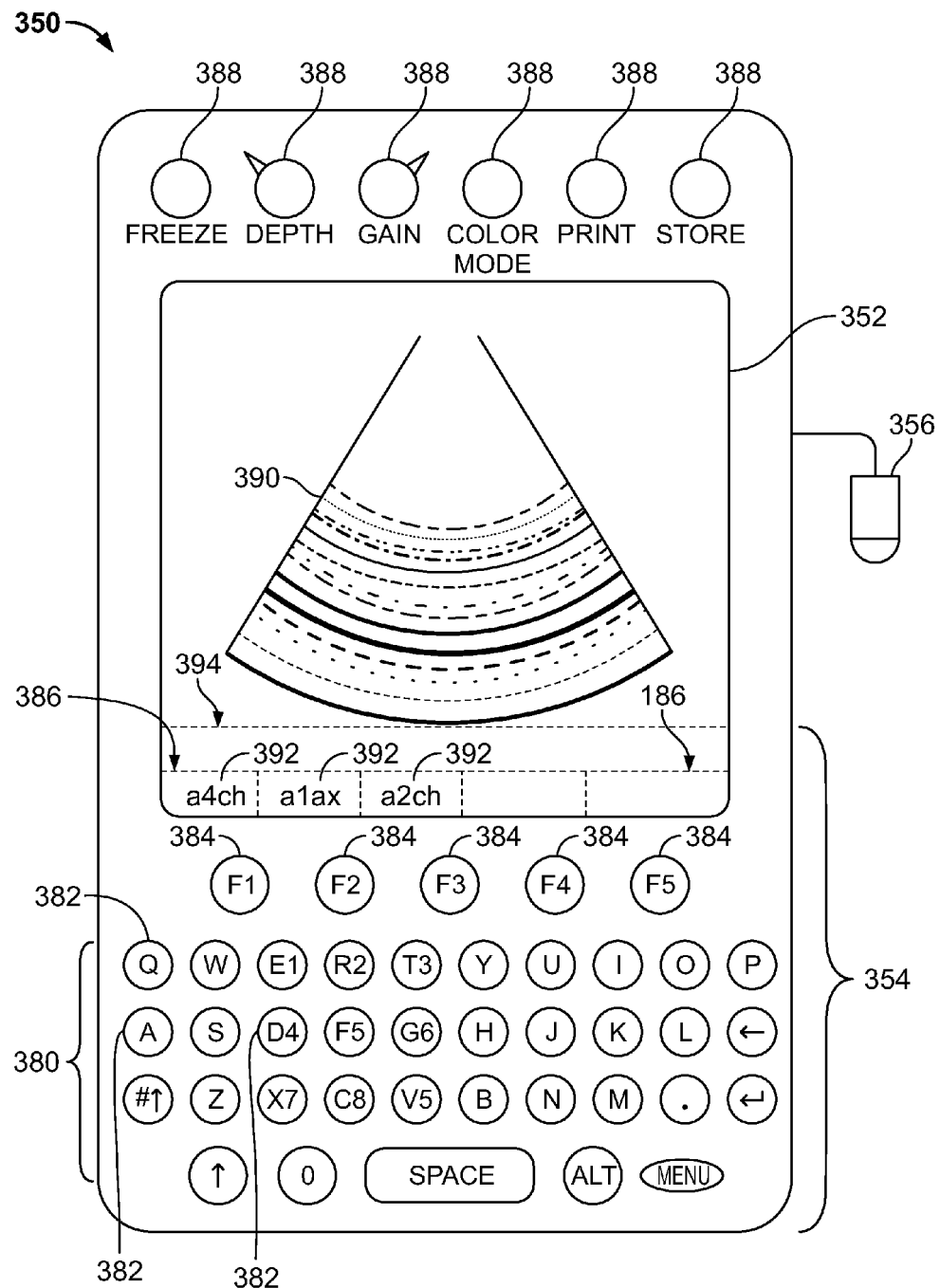
FIG. 10 illustrates a hand carried or pocket-sized ultrasound imaging system wherein the display and user interface form a single unit.
Figure 11:
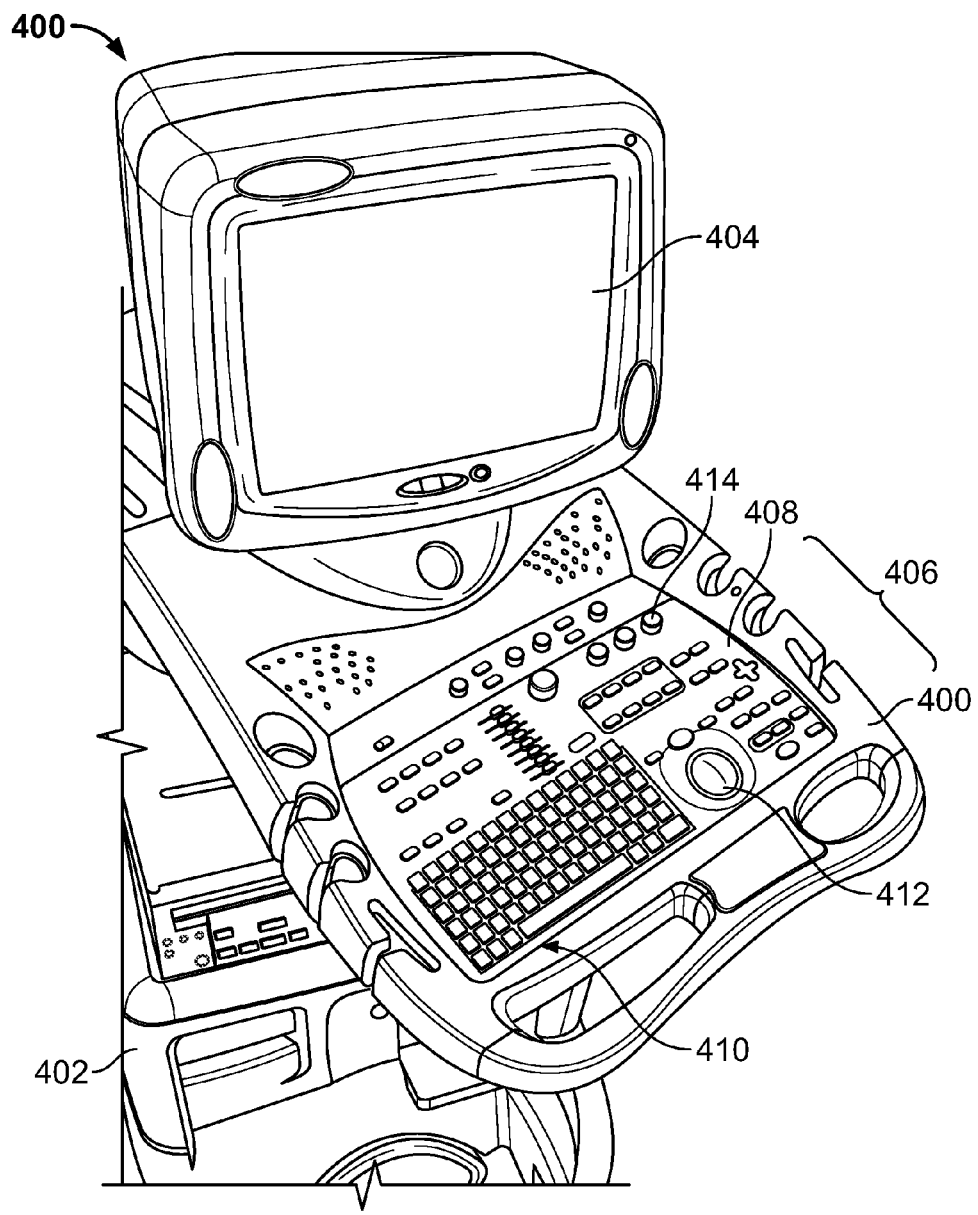
FIG. 11 illustrates an ultrasound imaging system provided on a movable base.

FIG. 1 is a screenshot 100 from a user interface (e.g., as shown in FIG. 9, FIG. 10, and/or FIG. 11) of an imaging system (e.g., shown in FIG. 9, FIG. 10, and/or FIG. 11). The screenshot 100 illustrates 2D images 106, 108 and 110 of an object of interest 112. The object of interest 112 may be any clinically relevant structure or anatomical feature. When used for prenatal sonography, the object of interest 112 may be a fetus. Thus, while the object of interest 112 described in various embodiments herein is a fetus, embodiments may be implemented in connection with other objects of interest. As is discussed below, various embodiments may be used with an imaging system that obtains a volumetric ultrasound image data set using a plurality of 2D images such as the 2D images 106, 108, and 110. The 2D images 106, 108, and 110 are also referred to as "image slices" herein. The imaging system generally includes an ultrasound probe for acquiring the 2D images 106, 108, and 110 within an imaging volume as is discussed below. In some embodiments, the imaging volume may encompass an imaging volume. The imaging system utilizes the 2D images 106, 108, and 110 to render a 3D image 120. The 3D image 120 is also referred to as a "rendering" or a "rendered image" in some embodiments.

The 3D image 120 includes at least a portion of the fetus 112 and may include other anatomical features that surround the fetus 112. The other anatomical features may constitute an occlusion that at least partially blocks a view of the fetus 112. As used herein, an occlusion(s) may be an object that blocks, obstructs, hides, and/or obfuscates at least part of the fetus 112. The occlusion may include one or more surrounding structures including, but not limited to, the womb, placenta, uterine tissue, and/or the like. Generally, a clinician uses a user interface to manually designate a region of interest (ROI) 122, for example, within the 2D image 106, to distinguish the fetus 112 from the surrounding tissue. The ROI 122 may be any shape, for example, in the illustrated embodiment, the ROI 122 is defined as a rectangular region.

Figure 5:
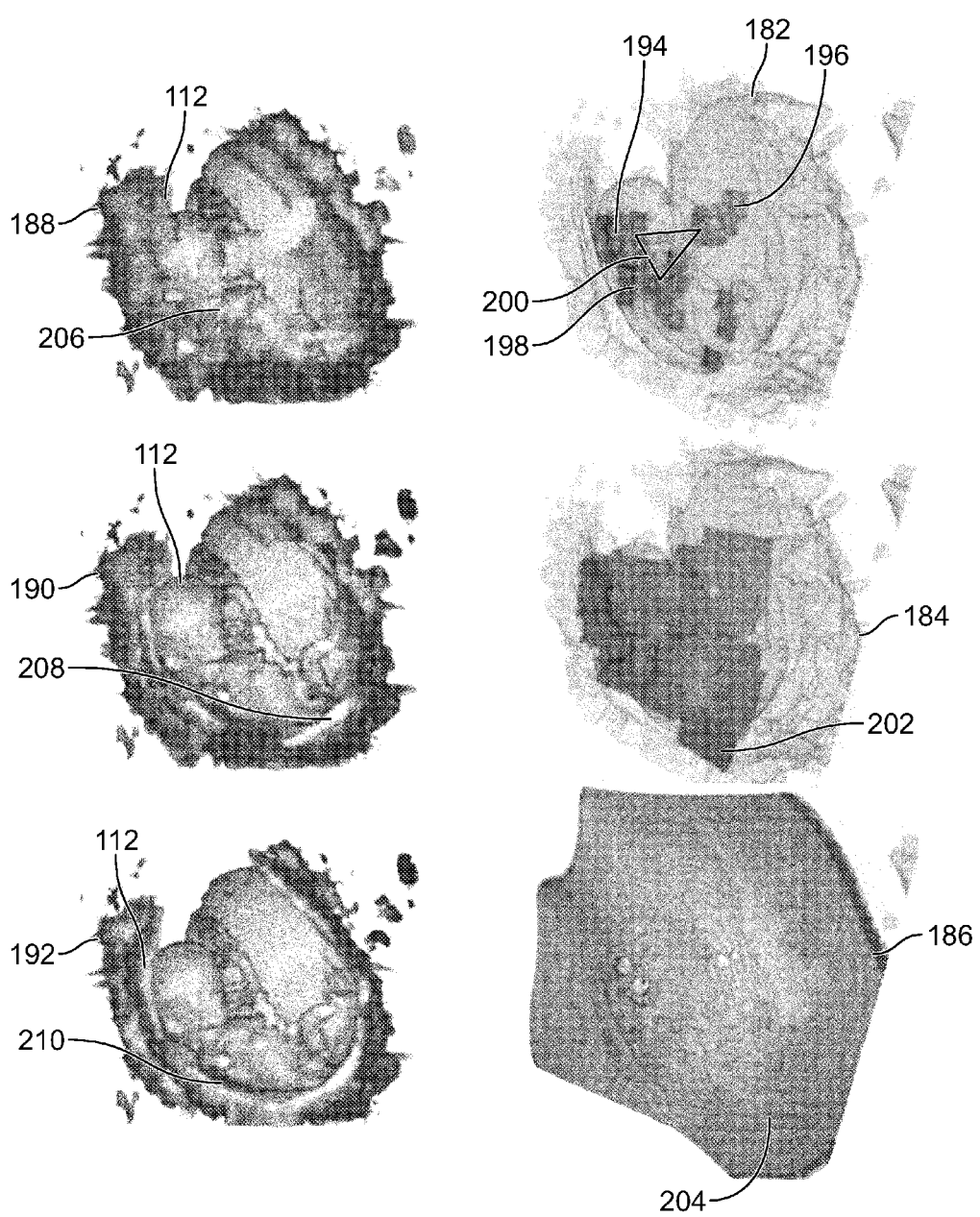
FIG. 5 shows reference images of a fetus and corresponding renderings respectively based on the reference images.

The imaging system uses the ROI 122 to create a clipping surface, such as one or more of the clipping surfaces 200, 202, or 204 (shown in FIG. 5). As discussed below, the clipping surface 200, 202, or 204 is a surface that separates (e.g., distinguishes) the fetus 112 from other features in the 3D image 120. The clipping surface 200, 202, or 204 is used to determine which portion(s) of the other features to include in the rendering. A clinician or operator may manually adjust the shape of the ROI 122 to define the shape of the clipping surface 200, 202, or 204. However, at least one technical effect of various embodiments is reducing or eliminating manual clinician or operator adjustment to the ROI 122. Accordingly, various embodiments described herein create the clipping surface 200, 202, or 204 automatically. In the illustrated embodiment, the fetus 112 is imaged, however, other anatomical features may be imaged. Further, different ultrasound imaging applications, as well as other imaging modalities, for example, computed tomography (CT) or magnetic resonance (MR) imaging may be implemented in connection with the various embodiments.

Figure 2:
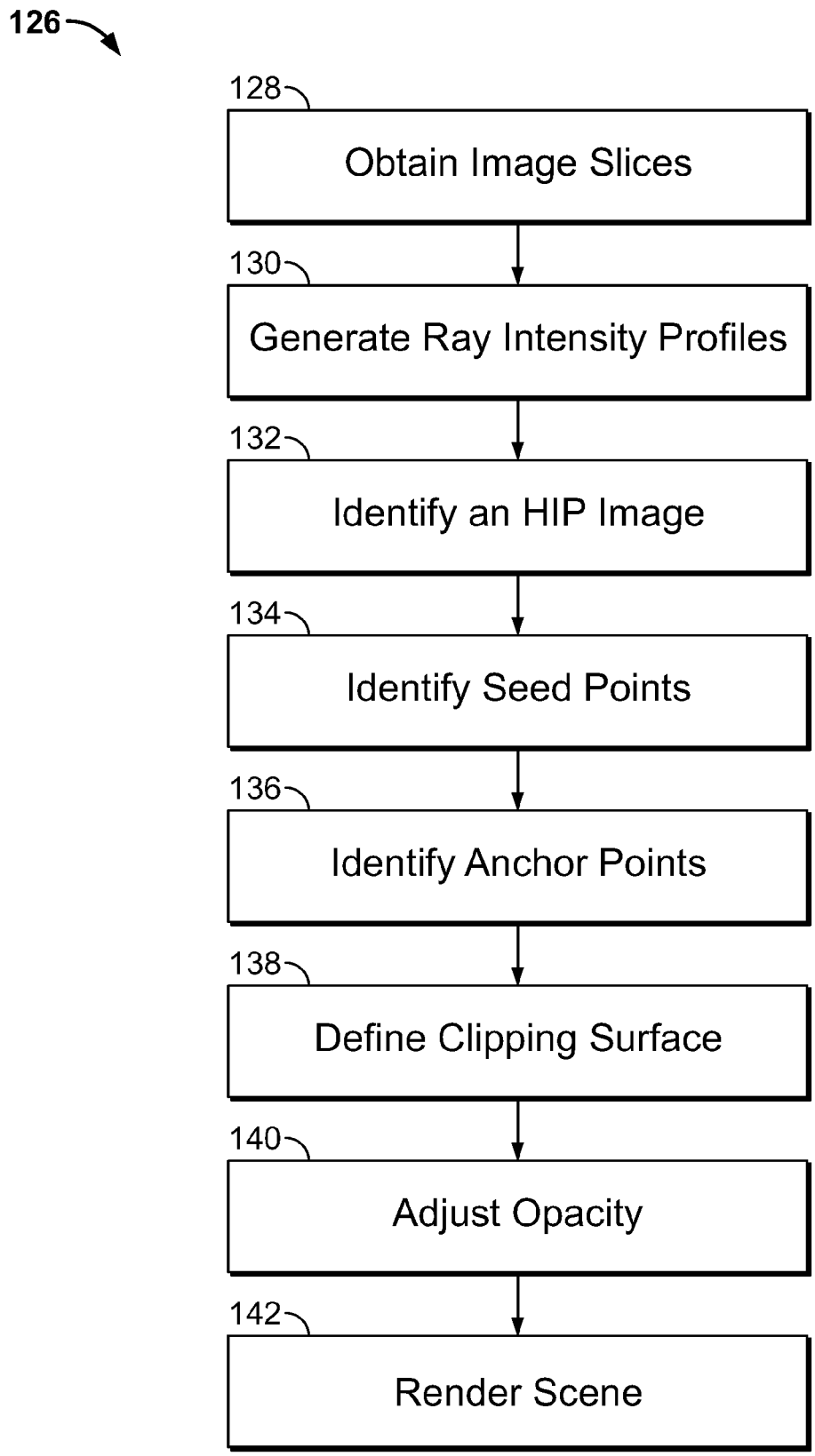
FIG. 2 is a flowchart of a method of defining a clipping surface and rendering a three-dimensional (3D) image from ultrasound image data in accordance with various embodiments.

FIG. 2 is a flowchart of a method 126 of defining a clipping surface, for example, the clipping surface 200, 202, or 204, and rendering the 3D image 120 from ultrasound image data in accordance with various embodiments described herein. The ultrasound image data may include a plurality of image slices, such as the 2D images 106, 108, and 110. The method 126 may at least partially automate the definition of the clipping surface 200, 202, or 204. The method 126, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 126 may be able to be used as one or more algorithms to direct hardware to perform operations described herein.

The method 126 includes at 128 obtaining one or more 2D image slices from a volumetric ultrasound image data set. The volumetric ultrasound image data set may include, for example, the 2D images 106, 108, and 110. Acquisition of the volumetric ultrasound data set may include, but is not limited to, accessing stored ultrasound data, acquiring ultrasound data by scanning a patient, and/or obtaining the data while the patient is being scanned during the patient examination.

Figure 3:
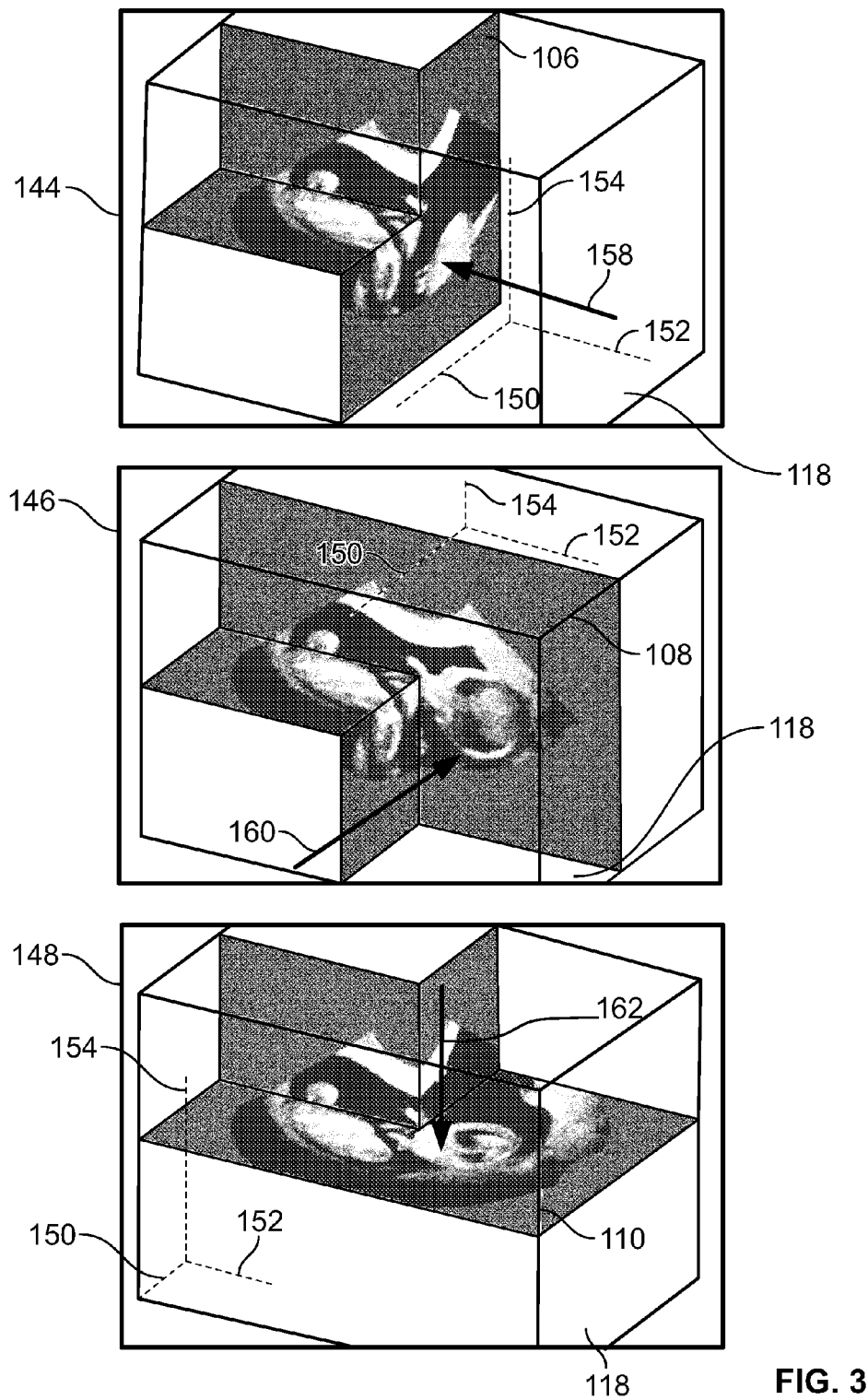
FIG. 3 shows diagrams of image slices within an imaging volume.

FIG. 3 shows diagrams 144, 146, and 148 with the 2D images 106, 108, and 110, respectively, within an imaging volume 118. The imaging volume 118 represents a rendering region having a Cartesian volume that includes at least a portion of the fetus 112 (shown in FIG. 1). The rendering region may include a portion of the patient that includes an object of interest. For example, the rendering region may include a portion of the abdomen of a patient. The imaging volume 118 includes a lateral imaging axis 150, a longitudinal imaging axis 152, and a depth imaging axis 154. In the illustrated embodiment, the imaging axes 150, 152, and 154 are mutually perpendicular, however, different imaging axes may be used that are oriented differently. For example, axes representing a curvilinear or a rectilinear grid may be used.

A plurality of images may be acquired. As illustrated in the diagram 144, the image slice 106 is an image on a cross-sectional plane aligned with the lateral imaging axis 150 and the depth imaging axis 154. Additionally, a plurality of images slices (not shown) aligned with the lateral imaging axis 150 and the depth imaging axis 154, but having a different position along the longitudinal axis 152, are also acquired. Similarly, the diagram 146 illustrates the image slice 108 that is on a cross-sectional plane aligned with the longitudinal imaging axis 152 and the depth imaging axis 154. A plurality of image slices (not shown) aligned with the longitudinal imaging axis 152 and the depth imaging axis 154, but having a different position along the lateral imaging axis 150 are also acquired. The diagram 148 illustrates the image slice 110 that is on a cross-sectional plane aligned with the lateral imaging axis 150 and the longitudinal imaging axis 152. A plurality of image slices (not shown) aligned with the lateral imaging axis 150 and the longitudinal imaging axis 152, but having a different position along the depth imaging axis 154 are also acquired. The plurality of images may be stored and processed at a later time.

Returning to the method 126 of FIG. 2 with continued reference to FIG. 3, at 130 one or more ray intensity profiles may be generated, such as the ray intensity profile described in connection with FIG. 4. The method 126 may utilize any known ray tracing method known in the art to generate the ray intensity profiles.

Referring again to FIG. 3, one or more rays 158, 160, and 162 may be used to generate the ray intensity profiles. The diagram 144 shows the ray 158 traversing through a pixel in the image slice 106. The ray 158 is perpendicular to the image slice 106 and is parallel with the longitudinal imaging axis 152. The ray 158 travels along the longitudinal imaging axis 152 through other image slices (not shown) that are parallel to the image slice 106. Similarly, the diagram 146 shows the ray 160 traversing through a pixel in the image slice 108. The ray 160 travels along the lateral imaging axis 150 through other image slices that are parallel to the image slice 108. The diagram 148 shows the ray 162 traversing through a pixel in the image slice 110. The ray 162 travels along the depth imaging axis 154 through other images slices that are parallel to the image slice 110. The rays 158, 160, and 162 may include a plurality of rays that traverse other different pixels in the image slices 106, 108, and 110. As the rays 158, 160, and 162 travel through the image slices, information relating to each pixel along the ray is acquired and/or recorded.

A ray casting module (or assembly) may then assign one or more pixel characteristic values for each point along each ray to create a ray profile for each ray. The ray profile may characterize a region as representative of amniotic fluid, fetal tissue, uterine tissue, bone, and/or the like. The pixel characteristic values may define color (e.g., an integer representation of the red, green, and blue contribution in a pixel), pixel intensity, opacity, and the like. Using the pixel characteristic values, the ray casting module may designate the type of material represented by the pixel. To determine the material type, the ray casting module may designate a pixel as a bright pixel or a dark pixel. Bright pixels may correspond to dense or solid materials (e.g., tissue or bone), whereas light pixels may correspond to less dense, or amorphous materials (e.g., liquid such as blood, amniotic fluid, and/or the like). Bright and dark pixels may be designated based on predetermined threshold values. For example, the ray casting module may designate pixels having a normalized intensity (e.g., bound between 0 and 255) value between 0 and 80 as dark pixels representing a region containing amniotic fluid. Similarly, the ray casting module may designate pixels having a normalized intensity value between 80 and 180 as light pixels representing a region containing tissue. The ray casting module may also designate pixels having a normalized intensity value greater than 180 light pixels representing bone or skeletal structure.

Figure 4:
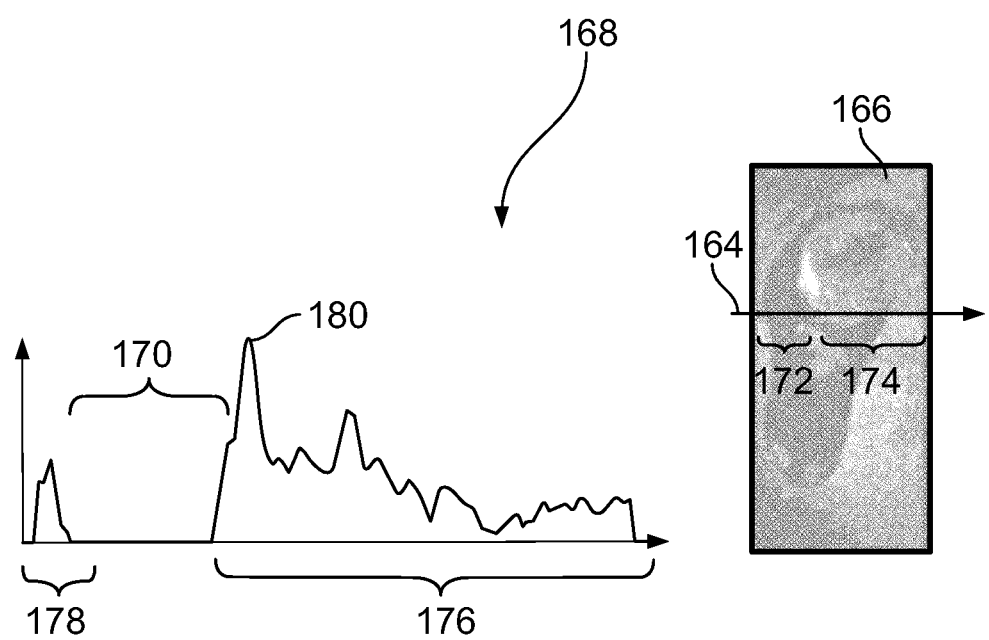
FIG. 4 illustrates a ray traversing an image slice and a graph of the corresponding ray intensity profile created using a ray casting method of various embodiments.

FIG. 4 illustrates a ray 164 traversing an image slice 166 and a graph 168 of the corresponding ray intensity profile created using a ray casting module. The ray 164 may be embodied, for example, as the ray 158, 160, and/or 162, and the image slice 166 may be the image slice 106, 108 or 110. As the ray 164 travels through the image slice 166, the ray casting module analyzes and stores pixel characteristics of pixels along the ray 164. For example, the ray casting module may collect and store the pixel intensity of each pixel along the length of the ray 164.

The graph 168 shows pixel intensity plotted as a function of the depth (e.g., length) of the ray 164. In the graph 168, the abscissa represents the length of the ray 164, and the ordinate represents the normalized intensity. The ray casting module may characterize the region 170 as a region having low intensity value and as a region having dark pixels, thus, containing amniotic fluid. The region 170 corresponds to the first portion 172 of the image slice 166 and may also be characterized as containing amniotic fluid. The ray casting module may characterize the regions 176 and 178 as regions having high intensity values and as regions having light pixels, thus, representing regions containing tissue. The region 176 corresponds to the second portion 174 of the image slice 166 and may be characterized as containing tissue. Further, a point or region containing an elevated intensity greater than a predetermined threshold or the average intensity may indicate a region containing bone (e.g., skull or skeleton of the fetus). For example, the intensity at peak 178 is greater than the average intensity, and may represent bone. It should be noted that a plurality of rays in addition to the ray 164 may traverse the image slice 166. The selection and masking process described herein is not limited to pixel intensity values, nor the specific embodiments described herein. Thus, methods described herein contemplate using different selection criteria or different selection methods. In general, the various embodiments use ray casting with one or more selection criteria to generate the clipping surface. Thus, different selection criteria, factors, or characteristics may be used in conjunction with or as an alternate to the pixel intensity. After the ray intensity profiles have been created, the method may proceed to 136.

At 132, the method generates a high intensity projection (HIP), which may be, for example, a combination of a plurality of image slices. The HIP may include one or more points along a ray that contains one or more select image characteristics as determined by the ray casting module. The HIP may be generated by masking the rays to obtain points along the rays having the characteristics. For example, one characteristic may be the pixel intensity. The HIP may determine the pixels that have an intensity in a predetermined range. For example, the range may include pixels having normalized pixel intensity values between 180 and 255. As another example, the range may include pixels having an intensity greater than a predetermined threshold (e.g., a normalized intensity of 180). As another option, the image characteristic may be the amount of contrast between light and dark pixels. In other embodiments, the clinician may vary the predetermined thresholds using the user interface, as discussed below.

At 134 one or more seed points may be identified based on the ray intensity profiles. The seed points may represent 3D points within the imaging volume 118 (shown in FIG. 3) having a desired image characteristic. The seed points are chosen from the HIP identified at 132 and represent the location of pixels within the HIP. For example, the seed points may represents points where pixels identified by the HIP have intensities greater than a predetermined intensity threshold. For example, in some embodiments, the seed points represent the location where pixels have a normalized intensity greater than 180. As another example, the seed points may represent the points having the greatest pixel intensity in the imaging volume 118. Thus, the seed points may represent a region containing bone or skeletal material. As another example, the desired image characteristic may be a change in the pixel intensity. As such, the seed points may represent light pixels (e.g., tissue or bone) that are surrounded by a region having dark pixels (e.g., amniotic fluid or blood). Thus, the seed points may be located on the surface of tissue or bone, which may be located near a region containing fluid. After the seed points have been identified, the method may proceed to 136.

At 136, one or more anchor points are identified. Anchor points represent 3D points within the imaging volume 118 and are based on the seed points. The anchor points may be offset from a corresponding seed point by a defined distance. The distance may be based on a change in the image characteristic profile. For example, a seed point may be located in a region containing skeletal material. The anchor point may then be a predetermined distance away from the seed point such that the anchor points reside in a region containing dark pixels (e.g., in a region outside of the fetus and within the amniotic fluid). To illustrate an example, returning to the ray 164 shown in FIG. 4, the graph 168 may be used to determine the location of an anchor point. The location of the peak 180 within the imaging volume 118 may be a seed point. Thus, the peak 180 may represent bone. The region 170 may represent a region containing amniotic fluid. Accordingly, an anchor point may be positioned within the region containing amniotic fluid by defining the point as a certain number of pixels therefrom. Thus, a plurality of anchor points may be established based on the seed points. After the anchor points have been established, the method may continue to 138.

At 138, the clipping surface is defined based on the anchor points. FIG. 5 shows a plurality of reference images 182, 184, and 186 of the fetus 112, and corresponding renderings 188, 190, and 192 based on the reference images 182, 184, and 186, respectively. The reference images 182, 184, and 186 show the progression or development of a clipping surface at various stages. As the clipping surface is defined and applied to the reference images 182, 184, and 186, different portions of the fetus 112 are visible in the rendering.

As discussed above, a clipping surface defines the boundary in the view whereby features on a first side of the clipping surface are rendered, and conversely, features on the opposite side of the clipping surface are not rendered. The reference image 182 shows a clipping surface 200 that is partially developed. The clipping surface 200 is defined by connecting the anchor points 194, 196, and 198. An iterative or recursive filling algorithm may define the contour of the clipping surface 200 based on the anchor points 194, 196, and 198. For example, a flood fill algorithm may define the remainder of the clipping surface 200. The rendering 188 is based on the reference image 182 and the clipping surface 200. The rendering 188 shows a first occluding portion 206 of the fetus 112. The occluding portion 206 is outside of the clipping surface 200, and blocks a view of the fetus 112.

Because the anchor points 194, 196, and 198 may reside between the fetus 112 (e.g., interesting structures) and the first occluding portion 206 (e.g., uninteresting structures), the clipping surface 200 may also be positioned between the fetus 112 and the first occluding portion 206. For example, the clipping surface 200 may reside within a region comprising amniotic fluid. Accordingly, in the rendering 188 corresponding to the clipping surface 200, a portion of the fetus 112 is visible, while other portions remain occluded.

The reference image 184 shows a clipping surface 202 that includes more anchor points (not shown) and covers more area than the clipping surface 200. Including more anchor points allows greater accuracy in conforming the clipping surface 202 to the fetus 112. The area covered by the clipping surface 202 may determine the amount of features that are shown. The rendering 190 is based on the reference image 184 and the clipping surface 202. The rendering shows a second occluding portion 208 that is smaller than the first occluding portion 206. In other words, more of the fetus 112 is visible in the rendering 190 as compared to the rendering 188. The reference image 186 shows a clipping surface 204 that is further developed than the clipping surface 184. Accordingly, the rendering 192 includes a third occluding portion 210 that is smaller compared to the first occluding portion 206 and the second occluding portion 208. Thus, more features of the fetus 112 are visible in the rendering 192.

Optionally, the method 126 may further process the clipping surface 204 to maintain a smooth contour. For example, the method 126 may apply a Gaussian filter to the clipping surface 204. As another example, the method 126 may apply an anti-aliasing filter to the clipping surface 204. As another example, the method may smooth the contour of the clipping surface 204 by interpolating between anchor points to create additional anchor points. After the clipping surface has been created, the method 126 may continue to 140.

Optionally, at 140 the opacity of features that intersect the clipping surface 204 may be adjusted. It may be desirable to include certain features of interest in the rendering 206, even though the feature may at least partially intersect the clipping surface 204. The method may utilize a transparency modulation algorithm to partially display the fetus 112. For example, the method may change the alpha blending value, transparency, or opacity of the feature that intersects the clipping surface 204. In one embodiment, the method 126 may modulate the opacity of a region within a portion of the rendering. For example, the opacity of a portion of the fetus 112 that intersects the clipping surface 204 may be rendered opaque. The opacity may vary based on the distance between the feature and the clipping surface 204. Features that are closer to the clipping surface 204 are less opaque than features that are further away from the clipping surface 204.

Figure 6:
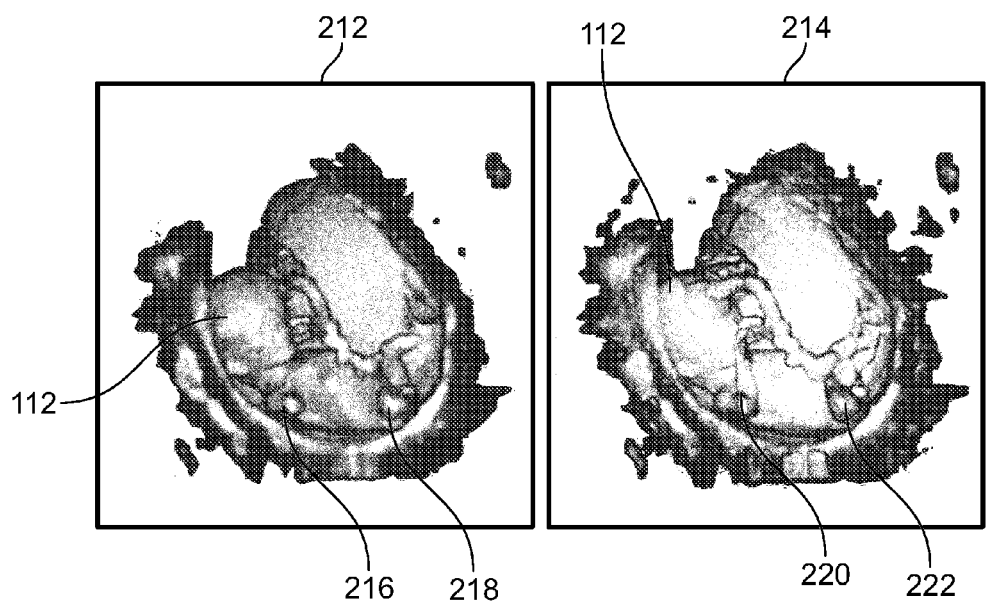
FIG. 6 illustrates a two image illustrating adjustments in opacity levels in accordance with various embodiments.

FIG. 6 illustrates a first rendering 212 that does not adjust the opacity of features near the clipping surface and a second rendering 214 that does adjust the opacity of features near the clipping surface. The first rendering 212 and the second rendering 214 are renderings of the same fetus 112. The fetus 112 rendered in the first rendering 212 includes several features that may be of interest, but are truncated because of the proximity of the feature to the clipping surface, including a portion of the arm 216 and a portion of the leg 218 of the fetus 112. The second rendering 214 shows a complete arm 220 and complete leg 222 (e.g., not truncated). The portion of the arm 216 and leg 218 that would otherwise be hidden is rendered opaque (e.g., transparent or rendered with an increased alpha blending value). Additionally, the transparency of the arm 220 increases as the arm 220 extends toward and is closer to the clipping surface. Similarly, the portion of the leg 222 that extends toward and is closer to the clipping surface is more transparent than the portion of the leg 222 that is further away from the clipping surface. Thus, displaying features that intersect the clipping surface as opaque may allow for a more satisfactory rendering of the object of interest.

Returning to FIG. 2, the method 126 may then proceed to 142. At 142, the image of the fetus 112 is rendered with reduced occluding.

Optionally, in various embodiments, the method may include interactive aspects. In one embodiment, the clinician may adjust threshold values. For example, the clinician may adjust the predetermined threshold used by the HIP (e.g., the pixel intensity threshold). Increasing the threshold may result in a less "aggressive" search for the boundary between the fetus and the amniotic fluid and may result in the clipping surface 200 being positioned further away from the fetus 112. Conversely, decreasing the threshold may result in a more "aggressive" search resulting in the clipping surface 200 being positioned closer to the fetus 112. After threshold values are selected, the method may return to 130 and regenerate the ray intensity profiles using the selected threshold values. The method 126 may repeat 130-142 until a desired view is rendered.

It should be noted that the various embodiments are not limited to the particular clipping surface detection methods described herein. In particular, the method described herein may implemented any suitable method, for example, to identify the border between tissue and fluid and then fit a curve to a contour defined by the identified border. The method generally determines portions of the view that should not be rendered such that interesting features of an object of interest is displayed to the user without, for example, rendered obstructing uninteresting features such as tissue.

Accordingly, various embodiments determine seed points to base anchor points within an imaging volume. A clipping surface is determined automatically based on the anchor or seed points. In various embodiments, renderings based on the clipping surface, result in images having less or reduced obstructing pixels, for example, tissue rendered that obstructs an area of interest, such as a face of a fetus.

Figure 7:
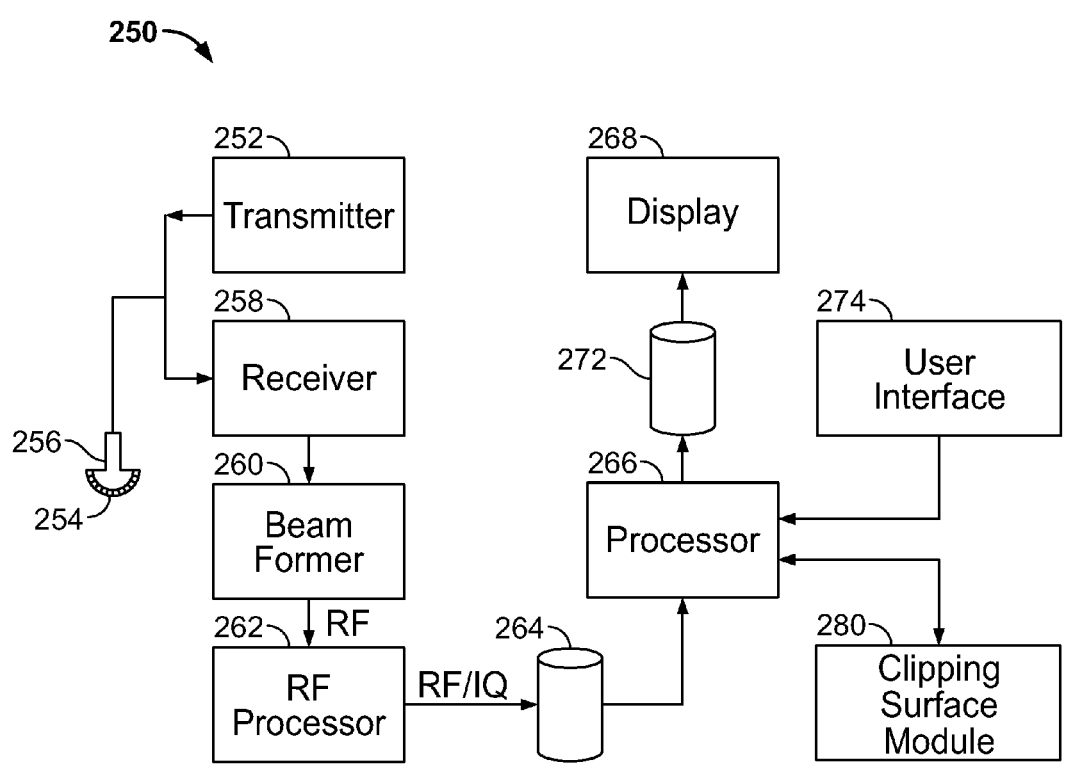
FIG. 7 is a block diagram the ultrasound system constructed in accordance with various embodiments.

Various embodiments, including the method 126 may be implemented in an ultrasound system 250 as shown in FIG. 7, which is a block diagram of the ultrasound system 250 constructed in accordance with various embodiments. The ultrasound system 250 is capable of electrical or mechanical steering of a soundbeam (such as in 3D space) and is configurable to acquire information (e.g., image slices) corresponding to a plurality of 2D representations or images in a subject or patient, which may be defined or adjusted as described in more detail herein. The ultrasound system 250 is configurable to acquire 2D images in one or more planes of orientation.

The ultrasound system 250 includes a transmitter 252 that, under the guidance of a beamformer 260, drives an array of elements 254 (e.g., piezoelectric elements) within a probe 256 to emit pulsed ultrasonic signals into a body. A variety of geometries may be used. The ultrasonic signals are back-scattered from structures in the body, like blood cells or muscular tissue, to produce echoes that return to the elements 254. The echoes are received by a receiver 258. The received echoes are passed through the beamformer 260, which performs receive beamforming and outputs an RF signal. The RF signal then passes through an RF processor 262. Alternatively, the RF processor 262 may include a complex demodulator (not shown) that demodulates the RF signal to form IQ data pairs representative of the echo signals. The RF or IQ signal data may then be routed directly to a memory 264 for storage.

In the above-described embodiment, the beamformer 260 operates as a transmit and receive beamformer. In an alternative embodiment, the probe 256 includes a 2D array with sub-aperture receive beamforming inside the probe. The beamformer 260 may delay, apodize and sum each electrical signal with other electrical signals received from the probe 256. The summed signals represent echoes from the ultrasound beams or lines. The summed signals are output from the beamformer 260 to an RF processor 262. The RF processor 262 may generate different data types, e.g. B-mode, color Doppler (velocity/power/variance), tissue Doppler (velocity), and Doppler energy, for multiple scan planes or different scanning patterns. For example, the RF processor 262 may generate tissue Doppler data for multi-scan planes. The RF processor 262 gathers the information (e.g. I/Q, B-mode, color Doppler, tissue Doppler, and Doppler energy information) related to multiple data slices and stores the data information, which may include time stamp and orientation/rotation information, in the memory 264.

The ultrasound system 250 also includes a processor 266 to process the acquired ultrasound information (e.g., RF signal data or IQ data pairs) and prepare frames of ultrasound information for display on display 268. The processor 266 is adapted to perform one or more processing operations according to a plurality of selectable ultrasound modalities on the acquired ultrasound data. Acquired ultrasound data may be processed and displayed in real-time during a scanning session as the echo signals are received. Additionally or alternatively, the ultrasound data may be stored temporarily in memory 264 during a scanning session and then processed and displayed in an off-line operation.

The processor 266 is connected to a user interface 274 that may control operation of the processor 266 as explained below in more detail. The display 268 includes one or more monitors that present patient information, including diagnostic ultrasound images to the user for diagnosis and analysis. One or both of memory 264 and memory 272 may store two-dimensional (2D) or three-dimensional (3D) data sets of the ultrasound data, where such 2D and 3D data sets are accessed to present 2D (and/or 3D images). The images may be modified and the display settings of the display 268 also manually adjusted using the user interface 274.

A clipping surface module 280 is also provided and connected to the processor 266. The module may be, for example, hardware circuitry coupled or connected to one or more processors. In some embodiments, the clipping surface defining module 280 may be software running on the processor 266 or hardware provided as part of the processor 266. The clipping surface module 280 defines or adjusts a clipping surface as described herein.

It should be noted that although the various embodiments may be described in connection with an ultrasound system, the methods and systems are not limited to ultrasound imaging or a particular configuration thereof. The various embodiments may be implemented in connection with different types of imaging systems, including, for example, x-ray imaging systems, magnetic resonance imaging (MRI) systems, computed-tomography (CT) imaging systems, positron emission tomography (PET) imaging systems, or combined imaging systems, among others. Further, the various embodiments may be implemented in non-medical imaging systems, for example, non-destructive testing systems such as ultrasound weld testing systems or airport baggage scanning systems.

Figure 8:
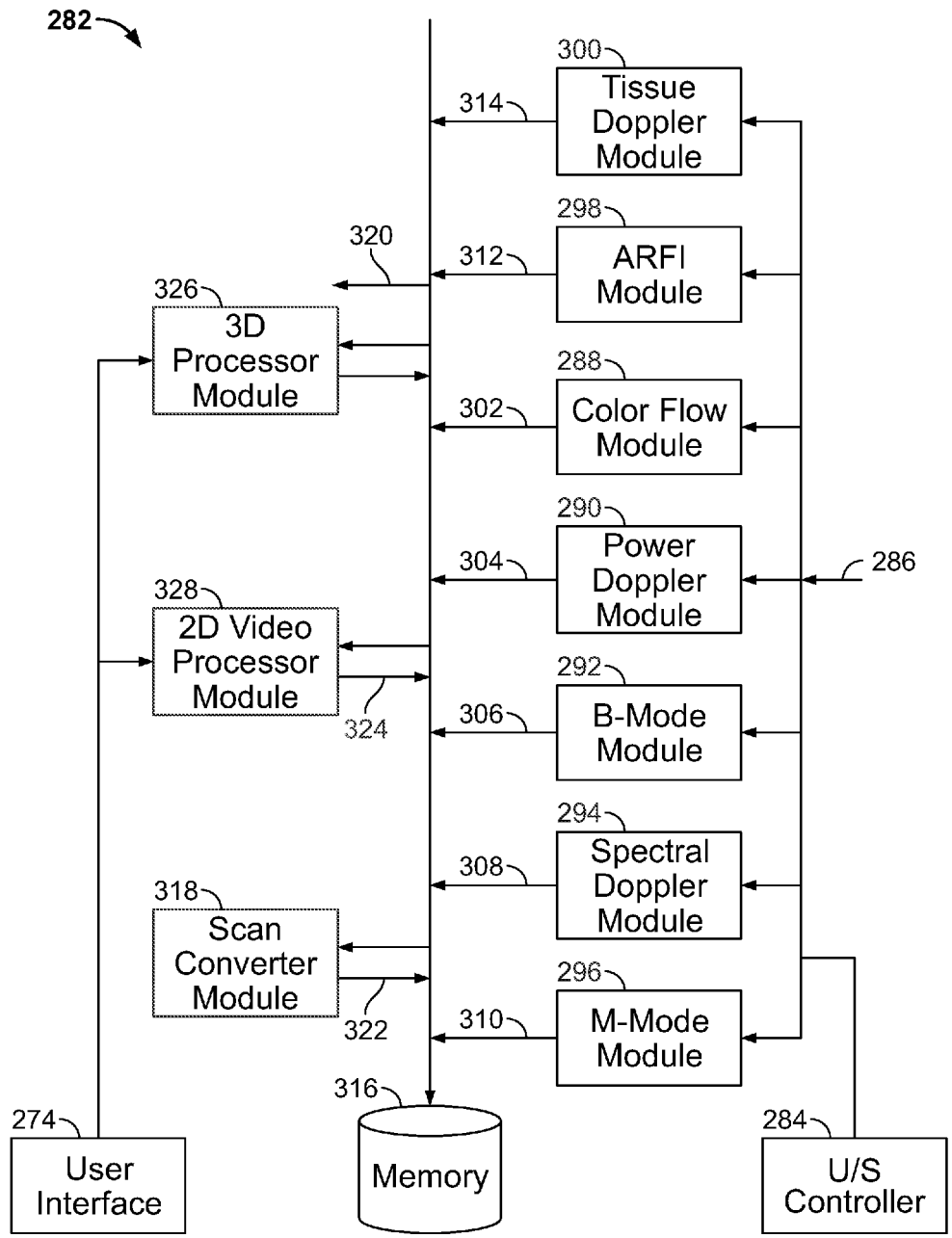
FIG. 8 is a block diagram of an ultrasound processor module, which may be embodied as the processor of FIG. 7 or a portion thereof.

FIG. 8 illustrates an exemplary block diagram of an ultrasound processor module 282, which may be embodied as the processor 266 of FIG. 7 or a portion thereof. The ultrasound processor module 282 is illustrated conceptually as a collection of sub-modules, but may be implemented utilizing any combination of dedicated hardware boards, DSPs, processors, etc. Alternatively, the sub-modules of FIGS. 7 and 8 may be implemented utilizing an off-the-shelf PC with a single processor or multiple processors, with the functional operations distributed between the processors. As a further option, the sub-modules of FIGS. 7 and 8 may be implemented utilizing a hybrid configuration in which certain modular functions are performed utilizing dedicated hardware, while the remaining modular functions are performed utilizing an off-the shelf PC and the like. The sub-modules also may be implemented as software modules within a processing unit.

The operations of the sub-modules illustrated in FIG. 8 may be controlled by a local ultrasound controller 284 or by the processor module 282. The sub-modules 288-300 perform mid-processor operations. The ultrasound processor module 282 may receive ultrasound data 286 in one of several forms. In the embodiment of FIG. 8, the received ultrasound data 286 constitutes I,Q data pairs representing the real and imaginary components associated with each data sample. The I,Q data pairs are provided to one or more of a color-flow sub-module 288, a power Doppler sub-module 290, a B-mode sub-module 292, a spectral Doppler sub-module 294 and an M-mode sub-module 296. Optionally, other sub-modules may be included such as an Acoustic Radiation Force Impulse (ARFI) sub-module 298 and a Tissue Doppler (TDE) sub-module 300, among others.

Each of sub-modules 288-300 are configured to process the I,Q data pairs in a corresponding manner to generate color-flow data 302, power Doppler data 304, B-mode data 306, spectral Doppler data 308, M-mode data 310, ARFI data 312, and tissue Doppler data 314, all of which may be stored in a memory 316 (or memory 264 or memory 272 shown in FIG. 7) temporarily before subsequent processing. For example, the B-mode sub-module 292 may generate B-mode data 306 including a plurality of B-mode image planes, such as in a triplane image acquisition.

The data 302-314 may be stored, for example, as sets of vector data values, where each set defines an individual ultrasound image frame. The vector data values are generally organized based on the polar coordinate system.

A scan converter sub-module 318 accesses and obtains from the memory 316 the vector data values associated with an image frame and converts the set of vector data values to Cartesian coordinates to generate an ultrasound image frame 322 formatted for display. The ultrasound image frames 322 generated by the scan converter module 318 may be provided back to the memory 316 for subsequent processing or may be provided to the memory 264 or the memory 272.

Once the scan converter sub-module 318 generates the ultrasound image frames 322 associated with, for example, B-mode image data, and the like, the image frames may be restored in the memory 316 or communicated over a bus 320 to a database (not shown), the memory 264, the memory 272 and/or to other processors.

The scan converted data may be converted into an X,Y format for video display to produce ultrasound image frames. The scan converted ultrasound image frames are provided to a display controller (not shown) that may include a video processor that maps the video to a grey-scale mapping for video display. The grey-scale map may represent a ray casting module of the raw image data to displayed grey levels. Once the video data is mapped to the grey-scale values, the display controller controls the display 268, which may include one or more monitors or windows of the display, to display the image frame. The image displayed in the display 268 is produced from image frames of data in which each datum indicates the intensity or brightness of a respective pixel in the display.

Referring again to FIG. 8, a 2D video processor sub-module 328 combines one or more of the frames generated from the different types of ultrasound information. For example, the 2D video processor sub-module 328 may combine a different image frames by mapping one type of data to a grey map and mapping the other type of data to a color map for video display. In the final displayed image, color pixel data may be superimposed on the grey scale pixel data to form a single multi-mode image frame 324 (e.g., functional image) that is again re-stored in the memory 316 or communicated over the bus 320. Successive frames of images may be stored as a cine loop in the memory 316 or memory 272. The cine loop represents a first in, first out circular image buffer to capture image data that is displayed to the user. The user may freeze the cine loop by entering a freeze command at the user interface 274. The user interface 274 may include, for example, a keyboard and mouse and all other input controls associated with inputting information into the ultrasound system 250.

A 3D processor sub-module 326 is also controlled by the user interface 274 and accesses the memory 316 to obtain 3D ultrasound image data and to generate three dimensional images, such as through volume rendering or surface rendering algorithms as are known. The 3D images may be generated utilizing various imaging techniques, such as ray-casting, high intensity projection (HIP) projection and the like.

The ultrasound system 250 of FIG. 7 may be embodied in a small-sized system, such as laptop computer or pocket-sized system as well as in a larger console-type system. FIGS. 9 and 10 illustrate small-sized systems, while FIG. 11 illustrates a larger system.

FIG. 9 illustrates a 3D-capable miniaturized ultrasound system 330 having a probe 332 that may be configured to acquire 3D ultrasonic data or multi-plane ultrasonic data. For example, the probe 332 may have a 2D array of elements as discussed previously with respect to the probe. A user interface 334 (that may also include an integrated display 336) is provided to receive commands from an operator. As used herein, "miniaturized" means that the ultrasound system 330 is a handheld or hand-carried device or is configured to be carried in a person's hand, pocket, briefcase-sized case, or backpack. For example, the ultrasound system 330 may be a hand-carried device having a size of a typical laptop computer. The ultrasound system 330 is easily portable by the operator. The integrated display 336 (e.g., an internal display) is configured to display, for example, one or more medical images.

The ultrasonic data may be sent to an external device 338 via a wired or wireless network 340 (or direct connection, for example, via a serial or parallel cable or USB port). In some embodiments, the external device 338 may be a computer or a workstation having a display. Alternatively, the external device 338 may be a separate external display or a printer capable of receiving image data from the hand carried ultrasound system 330 and of displaying or printing images that may have greater resolution than the integrated display 336.

FIG. 10 illustrates a hand carried or pocket-sized ultrasound imaging system 350 wherein the display 352 and user interface 354 form a single unit. By way of example, the pocket-sized ultrasound imaging system 350 may be a pocket-sized or hand-sized ultrasound system approximately 2 inches wide, approximately 4 inches in length, and approximately 0.5 inches in depth and weighs less than 3 ounces. The pocket-sized ultrasound imaging system 350 generally includes the display 352, user interface 354, which may or may not include a keyboard-type interface and an input/output (I/O) port for connection to a scanning device, for example, an ultrasound probe 356. The display 352 may be, for example, a 320×320 pixel color LCD display (on which a medical image 390 may be displayed). A typewriter-like keyboard 380 of buttons 382 may optionally be included in the user interface 354.

Multi-function controls 384 may each be assigned functions in accordance with the mode of system operation (e.g., displaying different views). Therefore, each of the multi-function controls 384 may be configured to provide a plurality of different actions. Label display areas 386 associated with the multi-function controls 384 may be included as necessary on the display 352. The system 350 may also have additional keys and/or controls 388 for special purpose functions, which may include, but are not limited to "freeze," "depth control," "gain control," "color-mode," "print," and "store."

One or more of the label display areas 386 may include labels 392 to indicate the view being displayed or allow a user to select a different view of the imaged object to display. The selection of different views also may be provided through the associated multi-function control 384. The display 352 may also have a textual display area 394 for displaying information relating to the displayed image view (e.g., a label associated with the displayed image).

It should be noted that the various embodiments may be implemented in connection with miniaturized or small-sized ultrasound systems having different dimensions, weights, and power consumption. For example, the pocket-sized ultrasound imaging system 350 and the miniaturized ultrasound system 330 may provide the same scanning and processing functionality as the system 250.

FIG. 11 illustrates an ultrasound imaging system 400 provided on a movable base 402. The portable ultrasound imaging system 400 may also be referred to as a cart-based system. A display 404 and user interface 406 are provided and it should be understood that the display 404 may be separate or separable from the user interface 406. The user interface 406 may optionally be a touchscreen, allowing the operator to select options by touching displayed graphics, icons, and the like.

The user interface 406 also includes control buttons 408 that may be used to control the portable ultrasound imaging system 400 as desired or needed, and/or as typically provided. The user interface 406 provides multiple interface options that the user may physically manipulate to interact with ultrasound data and other data that may be displayed, as well as to input information and set and change scanning parameters and viewing angles, etc. For example, a keyboard 410, trackball 412 and/or multi-function controls 414 may be provided.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer."

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof.

The block diagrams of embodiments herein illustrate various blocks labeled "module." It is to be understood that the modules represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more field programmable gate array (FPGA), application specific integrated circuit (ASIC), or microprocessor. The circuit modules in various embodiments may be configured to execute one or more algorithms to performs functions described herein. The one or more algorithms may include aspects of embodiments disclosed herein, whether or not expressly identified in a flowchart or a method.

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method of visualizing three-dimensional (3D) ultrasound data, the method comprising:
acquiring image slices from a volumetric image data set;
generating a ray profile using one or more rays through at least one of the image slices, the one or more rays extending along a depth of the volumetric image data set;
identifying one or more seed points along the one or more rays based on the ray profile;
identifying one or more anchor points located a defined distance relative to the one or more seed points;
defining a clipping surface iteratively or recursively using the one or more anchor points, the clipping surface defining a rendering region within the volumetric image data set; and
rendering a 3D image of the rendering region within the volumetric image data set.

2. The method of claim 1, wherein the ray profile includes at least one of a pixel intensity, a pixel color, or a pixel opacity.

3. The method of claim 1, wherein the one or more seed points correspond to a point having a pixel intensity greater than a predetermined threshold along of the ray.

4. The method of claim 1, wherein the one or more seed points correspond to a predetermined amount of change in the intensity of the ray along the ray.

5. The method of claim 1, wherein defining the clipping surface further comprises connecting the anchor points.

6. The method of claim 5, wherein the contour of the clipping surface varies smoothly.

7. The method of claim 1, wherein the rendering further comprising modulating an opacity of a feature at least partially intersecting the clipping surface, the opacity of the feature varying based on a distance between the clipping surface and the feature.

8. The method of claim 1, wherein identifying seed points further comprises generating a high intensity projection (HIP), wherein the seed points are identified within the HIP.

9. The method of claim 1, wherein the ultrasound images correspond to an imaged fetus.

10. The method of claim 1, wherein the ray profile further characterizes a region in the image data set as at least one of amniotic fluid, fetal tissue, uterine tissue, or bone.

11. The method of claim 10, wherein the clipping surface is in a region representative of amniotic fluid in the image data set.

12. An ultrasound imaging system comprising:
an ultrasound probe configured to acquire a volumetric image data set having a plurality of image slices;
a ray casting module configured to traverse a ray through the ultrasound image slices to create a ray profile, the ray casting module further configured to create a clipping surface based on the ray profile;
a visualization module configured generate a representation of an object of interest and remove occluded select first features based on the clipping surface and modulate an opacity of select second features of the object of interest that intersect the clipping surface, wherein the contour of the clipping surface is iteratively or recursively based on anchor points positioned within the volumetric image data, the location of the anchor points determined by the ray profile, the opacity of the select second features varying based on a distance between the clipping surface and the select second features: and
a display configured to display the representation of the object.

13. The system of claim 12, wherein the object of interest corresponds to an imaged fetus and the ray casting module is further configured to identify at least one of amniotic fluid, fetal tissue, surrounding tissue, or bone.

14. The system of claim 12, further comprising a user interface configured to receive inputs for use by the ray casting module or the visualization module to manipulate the representation of the object of interest.

15. A method of visualizing a fetus for prenatal sonography, the method comprising:
   acquiring a plurality of ultrasound image slices with varying depth through an imaging volume;
   analyzing the ultrasound image slices by traversing one or more rays through one or more pixels in the image slices;
   creating a ray profile using a ray casting module, wherein the ray profile includes at least one of an intensity, a color, or an opacity corresponding to points along the ray;
   identifying at least one seed point along the ray based on the ray profile;
   identifying one or more anchor points located a defined distance relative to the at least one seed point, the one or more anchor points located within regions identified as regions containing amniotic fluid,
   defining a clipping surface iteratively or recursively based on the one or more anchor points; and
   rendering an image of the fetus based on the clipping surface.

16. The method of claim 15, wherein the seed point corresponds to a one or more points along the ray having a pixel intensity greater than a predetermined value.

17. The method of claim 15, wherein the seed point corresponds to a one or more points along the ray having a change in pixel intensity greater than a predetermined value.

18. The method of claim 15, further comprising modulating an opacity of a feature at least partially intersecting the clipping surface, the opacity of the feature varying based on a distance between the clipping surface and the feature.

19. The method of claim 15, further comprising generating a high intensity projection (HIP), wherein the seed points are identified within the HIP.

20. The method of claim 15, wherein the ray casting further identifies a region in the imaging volume containing amniotic fluid.

* * * * *